United States Patent
Yanagiguchi et al.

(10) Patent No.: US 7,528,221 B2
(45) Date of Patent: May 5, 2009

(54) MODIFIED POLYTETRAFLUOETHYLENE MOLDED ARTICLE AND PROCESS FOR MANUFACTURE THEREOF

(75) Inventors: Tomihiko Yanagiguchi, Settsu (JP); Shinichi Yano, Settsu (JP); Masamichi Sukegawa, Settsu (JP); Hirokazu Yukawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 20 days.

(21) Appl. No.: 11/791,717

(22) PCT Filed: Nov. 30, 2005

(86) PCT No.: PCT/JP2005/021986

§ 371 (c)(1),
(2), (4) Date: May 29, 2007

(87) PCT Pub. No.: WO2006/059642

PCT Pub. Date: Jun. 8, 2006

(65) Prior Publication Data

US 2008/0125548 A1     May 29, 2008

(30) Foreign Application Priority Data

Nov. 30, 2004  (JP) ............................. 2004-346686
Sep. 30, 2005  (JP) ............................. 2005-289462

(51) Int. Cl.
*C08G 64/00* (2006.01)
*C08G 63/02* (2006.01)

(52) U.S. Cl. ................ 528/480; 264/123; 264/127; 427/384; 427/385.5; 428/35.7; 428/304.4; 428/421; 428/422

(58) Field of Classification Search ................ 264/123, 264/127; 427/384, 385.5; 428/35.7, 304.4, 428/421, 422; 528/480
See application file for complete search history.

(56) References Cited

U.S. PATENT DOCUMENTS 3,245,972 A * 4/1966 Anderson et al. ........... 428/402

| 5,709,944 A | 1/1998 | Kokumai et al. |
| 5,763,082 A | 6/1998 | Kokumai et al. |
| 2003/0111798 A1 | 6/2003 | Yanagiguchi et al. |
| 2005/0010007 A1 | 1/2005 | Tsuji et al. |

FOREIGN PATENT DOCUMENTS

| EP | 0583481 A1 | 2/1994 |
| JP | 6-8344 | 1/1994 |
| JP | 11-35709 | 2/1999 |
| JP | 11-35709 A | 2/1999 |
| JP | 11-70558 | 3/1999 |
| JP | 3177983 B2 | 4/2001 |
| JP | 2001-304420 | 10/2001 |
| WO | WO 93/16126 A1 | 8/1993 |
| WO | WO 01/70854 A1 | 9/2001 |
| WO | WO 03/035724 A | 5/2003 |

\* cited by examiner

*Primary Examiner*—Terressa M Boykin
(74) *Attorney, Agent, or Firm*—Sughrue Mion, PLLC

(57) ABSTRACT

It is an object of the present invention to obtain a PTFE molding excellent in flexing resistance without decreasing the tensile strength and tensile elongation. The present invention is a modified polytetrafluoroethylene molded article obtained by molding a modified polytetrafluoroethylene molding powder, wherein the modified polytetrafluoroethylene molding powder is not melt-moldable, the modified polytetrafluoroethylene constituting the modified polytetrafluoroethylene molding powder contains 0.01 to 1% by mass of a perfluorovinyl ether unit represented by the formula (I):

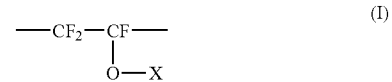

(wherein X is a perfluoroalkyl group containing 1 to 6 carbon atoms or a perfluoroalkoxyalkyl group containing 4 to 9 carbon atoms) and the heat of crystallization thereof is 18.0 to 25.0 J/g as measured using a differential scanning calorimeter, and the modified polytetrafluoroethylene molded article has a heat of fusion of not more than 28 J/g and a flex life of at least $200 \times 10^4$ cycles.

14 Claims, No Drawings

MODIFIED POLYTETRAFLUOETHYLENE MOLDED ARTICLE AND PROCESS FOR MANUFACTURE THEREOF

TECHNICAL FIELD

The present invention relates to a modified polytetrafluoroethylene molded article and a method of producing a modified polytetrafluoroethylene molded article.

BACKGROUND ART

One of the various fields of application of polytetrafluoroethylene [PTFE] moldings includes pumps, bellows, diaphragms and like apparatus members or elements required to have remarkable flexing resistance or flexibility.

Generally, compression molding techniques are frequently used in the art for obtaining those PTFE moldings. For compression molding of PTFE, there are available the batch type molding method comprising filling a mold with a resin powder, compressing the powder to form a preshaped compact mass and sintering the same, and the ram extrusion molding method comprising charging an axially long mold with a resin powder and continuously performing compression and sintering.

For the purpose of improving the flexing resistance of PTFE moldings, a technique is known which comprises lowering the crystallinity in moldings. For example, a sputter-resistant polytetrafluoroethylene tube intended for use as a mobile part or member and having a ratio between the strength in the longitudinal direction and the strength in the diameter direction of 2.5:1 to 1:1 has been proposed (cf. e.g. Patent Document 1: Japanese Kokai (Laid-open) Publication H11-70558). However, this technology uses a fine powder obtained by emulsion polymerization and the molding method applicable thereto is disadvantageously limited.

As a seal ring made of PTFE reduced in crystallinity, one whose crystallinity is controlled within the range of 25 to 35% has been proposed for the purpose of durability improvement (cf. e.g. Patent Document 2: Japanese Kokai Publication 2001-304420).

On the other hand, the crystallinity of PTFE moldings greatly influences the gas/chemical liquid barrier properties and, for improving the barrier properties, it is necessary to increase the crystallinity.

For producing high-crystallinity PTFE moldings, a method has been proposed which comprises sintering PTFE moldings at a temperature higher than the melting point of the resin, followed by cooling over 0.5 to 10 minutes at temperatures around the crystallization temperature (cf. e.g. Patent Document 3: Japanese Kokai Publication H06-8344). This method is to give porous bodies. Since it is necessary to carry out the cooling after sintering gradually, much time is required for the sintering and cooling steps, hence there is a productivity problem.

When PTFE moldings are obtained by compression molding in a narrow sense of the term and where flexing resistance is required in the intended use thereof, rapid cooling in the step of sintering preshaped bodies (preforms) is a general practice for attaining decreases in crystallinity (cf. e.g. Patent Document 1).

However, even when an attempt is made at rapid cooling in a sintering furnace, there arises a problem that insufficient rapid cooling will result due to the influence of the remaining heat. According to the method comprising taking the moldings in a molten state out of the furnace and immediately placing the same in water, it is possible to attain rapid cooling relatively easily but the method has workability and operability problems.

For compression molding in a narrow sense of the term, a method (hot coining) is also known which comprises removing the push punch alone while the preshaped preform is retained in the mold, heating the preform in a sintering furnace until melting of PTFE, taking the molding in a molten state, together with the mold, out of the sintering furnace, keeping the molding in a molten state again under pressure and cooling the same with water. This method makes it easy to reduce the crystallinity relatively easily and obtain PTFE moldings excellent in flexing resistance. However, this method has a problem in that the productivity is poor.

On the contrary, ram extrusion molding is generally excellent in productivity. The PTFE moldings obtained by ram extrusion molding are low in crystallinity owing to the method of production thereof. However, the method has a problem in that the moldings are poor in mechanical physical properties as compared with compression molding in a narrow sense of the term or with hot coining. Therefore, the tensile strength and tensile elongation are low and, in some cases, the joints or seams exert a very bad influence; therefore, under the existing circumstances, PTFE moldings obtained by ram extrusion molding are generally not used as important parts.

A powder proposed as a molding powder suited for compression molding in a narrow sense of the term and for ram extrusion molding is a powder of a modified PTFE species containing a specified amount of a specific perfluorovinyl ether unit species and having a specified heat of crystallization and having a specified specific surface area and a specified average particle diameter and, further, capable of providing moldings having a specified flex life and a specified level of creep resistance (cf. e.g. Patent Document 4: WO 93/16126). In recent years, however, moldings have been required to have still higher levels of physical properties.

DISCLOSURE OF INVENTION

Problems Which the Invention is to Solve

In view of the above-discussed state of the art, it is an object of the present invention to obtain PTFE moldings excellent in flexing resistance without decreasing the tensile strength and tensile elongation.

Means for Solving the Problems

The present invention is a modified polytetrafluoroethylene molded article obtained by molding a modified polytetrafluoroethylene molding powder, wherein the modified polytetrafluoroethylene molding powder is not melt-moldable, the modified polytetrafluoroethylene constituting the modified polytetrafluoroethylene molding powder contains 0.01 to 1% by mass of a perfluorovinyl ether unit represented by the formula (I):

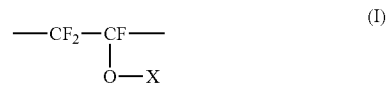

(wherein X is a perfluoroalkyl group containing 1 to 6 carbon atoms or a perfluoroalkoxyalkyl group containing 4 to 9 carbon atoms) and the heat of crystallization thereof is 18.0 to 25.0 J/g as measured using a differential scanning calorimeter, and the modified polytetrafluoroethylene molded article has a heat of fusion of not more than 28 J/g and a flex life of at least $200\times10^4$ cycles.

The present invention is a method of producing a modified polytetrafluoroethylene molded article comprising a sintering treatment of a pretreatment sintered compression molding obtained by molding a modified polytetrafluoroethylene powder, wherein the pretreatment sintered compression molding is prepared by sintering an unsintered compression molding obtained by molding a modified polytetrafluoroethylene powder at a sintering temperature of not lower than the melting point of the modified polytetrafluoroethylene powder, followed by cooling to a temperature lower than the melting point of the modified polytetrafluoroethylene powder, and the sintering treatment is carried out by sintering at a temperature of not lower than the melting point of the modified polytetrafluoroethylene powder.

The present invention is a modified polytetrafluoroethylene molded article which is produced by the above-mentioned method of producing a modified polytetrafluoroethylene molded article.

In the following, the invention is described in detail.

The modified polytetrafluoroethylene [modified PTFE] molding according to the invention is formed using a modified PTFE powder. The modified PTFE powder is not particularly restricted but may be any of the modified PTFE molding powders which are not melt-moldable, preferably those described below.

The modified PTFE constituting the above-mentioned modified PTFE molding powders contains, in addition to the tetrafluoroethylene [TFE]-derived TFE unit, a perfluorovinyl ether unit represented by the following formula (I):

(In the above formula, X is a perfluoroalkyl group containing 1 to 6 carbon atoms or a perfluoroalkoxyalkyl group containing 4 to 9 carbon atoms.)

The above perfluorovinyl ether unit is derived from a perfluorovinyl ether.

The perfluorovinyl ether includes, among others, perfluoro(alkyl vinyl ether) species having a perfluoroalkyl group containing 1 to 6 carbon atoms, and perfluoro(alkoxyalkyl vinyl ether) species having an alkoxyalkyl group containing 4 to 9 carbon atoms.

As the perfluoro(alkyl vinyl ether), there may be mentioned, among others, perfluoro(methyl vinyl ether) [PMVE], perfluoro(ethyl vinyl ether) [PEVE], perfluoro(propyl vinyl ether) [PPVE] and perfluoro(butyl vinyl ether).

As the perfluoro(alkoxyalkyl vinyl ether), there may be mentioned, among others, perfluoro(2-methoxypropyl vinyl ether) and perfluoro(2-propoxypropyl vinyl ether).

From the thermal stability viewpoint, PPVE, PEVE and PMVE are preferred as the perfluorovinyl ether, and PPVE is more preferred.

The modified PTFE mentioned above contains the above-mentioned perfluorovinyl ether unit at a level of 0.01 to 1% by mass.

When the perfluorovinyl ether unit content is lower than the above-specified range, the creep resistance will be low and, when it is higher than the above range, the tensile strength and crack resistance will be low and, in addition, such a high content is disadvantageous from the cost viewpoint.

A preferred lower limit to the perfluorovinyl ether unit content is 0.03% by mass, and a preferred upper limit thereto is 0.2% by mass.

In the practice of the invention, the above-mentioned modified PTFE may contain one, or two or more, of the perfluorovinyl ether units mentioned above provided that the content thereof is within the range specified above.

In the present specification, the perfluorovinyl ether unit content is a value obtained by infrared spectroscopy within the characteristic absorption range of 1040 to 890 cm$^{-1}$.

The above-mentioned modified PTFE has a heat of crystallization of 18.0 to 25.0 J/g as measured using a differential scanning calorimeter.

A preferred upper limit to the heat of crystallization is 23.5 J/g.

The heat of crystallization is the quantity of heat as calculated based on the crystallization point peak measured by heating an about 3 mg-portion of a sample to 250° C. at a rate of 50° C./minute on a model DSC-50 differential scanning calorimeter (product of Shimadzu Corporation), once maintaining at that temperature, then further heating to 380° C. at a rate of 10° C./minute to melt the crystals and, thereafter, lowering the temperature at a rate of 10° C./minute.

The above-mentioned modified PTFE can be obtained by polymerizing TFE and a perfluorovinyl ether.

The modified PTFE is not particularly restricted but preferably is one obtained by suspension polymerization.

The suspension polymerization is preferably carried out in the presence of an aqueous medium at a polymerization set at 0 to 100° C., for instance.

In the above suspension polymerization, an emulsifier and/or the like may also be used. Preferably used as the polymerization initiator is a persulfate salt such as ammonium persulfate, for instance.

The amounts of the emulsifier and polymerization initiator can be properly selected according to the kinds of the monomers, among others, the desired composition of the modified PTFE, and other factors.

When, for example, an emulsifier is used in an amount of 1 to 200 ppm relative to the aqueous medium, a modified PTFE molding powder with a large surface area can be obtained, as described later herein.

The modified PTFE molding powder obtained by suspension polymerization is sometimes referred to as "molding powder".

The above-mentioned PTFE molding powder can be obtained by subjecting the modified PTFE obtained by carrying out the above-mentioned polymerization to drying, pulverizing and other treatments in the conventional manner, for example using the method described in WO 93/16126, for instance.

As the pulverizing treatment, there may be mentioned, for example, shear pulverizing and impact pulverizing.

In the present specification, shear pulverizing refers to a method of pulverizing based on crushing or trituration by a shearing force. In shear pulverizing, an impact action produced by a hammer rotating at a high speed is generally utilized, for example in pulverizing using a hammer mill or a like grinder.

In the present specification, impact pulverizing refers to a method of pulverizing based on an impact force substantially without exerting any shearing force. In impact pulverizing, collision between the particles as caused by a high-speed air current is generally utilized, for example in pulverizing using such a grinder as an air jet mill.

From the flexing resistance viewpoint, impact pulverizing is preferred as the method of pulverizing for preparing the above-mentioned modified polymer molding powder.

In the practice of the invention, the modified PTFE molding powder may be the powder itself as obtained from the polymerization reaction mixture obtained after polymerization, the fine powder resulting from appropriate pulverizing of that powder, or the product of granulation of that powder or fine powder. Granulation products are preferred, however, from the handleability and workability viewpoint.

The modified PTFE molding powder preferably has a narrow particle size distribution.

The modified PTFE molding powder may contain one or more of such additives as colorants and antistatic agents as incorporated therein.

The modified PTFE molding powder preferably has a specific surface area of 0.5 to 9.0 m$^2$/g. A more preferred lower limit to the specific surface area is 0.8 m$^2$/g, and a more preferred upper limit thereto is 4.0 m$^2$/g.

In the present specification, the above-mentioned specific surface area is measured by the nitrogen adsorption method described in Analytical Chemistry, Vol. 30, page 1387 (1985) using Monosorb (product of Yuasa Ionics Inc.).

When it is obtained by suspension polymerization, the modified PTFE molding powder according to the invention can be reduced in particle diameter by pulverizing. A smaller average particle diameter is preferred since it tends to lead to a reduced void content in the finally obtained modified PTFE molded articles.

When it is not granulated, the modified PTFE molding powder preferably has an average particle diameter of not greater than 100 μm as determined by dry laser method. A more preferred upper limit is 50 μm, a still more preferred upper limit is 40 μm, and a particularly preferred upper limit is 30 μm.

When it is obtained by carrying out shear pulverizing, the modified PTFE molding powder preferably has an average particle diameter of not greater than 100 μm, more preferably not greater than 50 μm, as measured by dry laser method. Within such ranges, the average particle diameter may be 3 μm or greater. The powder obtained by shear pulverizing generally occurs as an amorphous fine powder.

When it is obtained by carrying out impact pulverizing, the modified PTFE molding powder preferably has an average particle diameter of not greater than 50 μm, more preferably not greater than 30 μm, as measured by dry laser method. If the powder is a fine one within such a range, the average particle diameter thereof may be 3 μm or greater.

When it is a granulated one, namely a granulation product, the modified PTFE molding powder according to the present invention is preferably one obtained from a corresponding powder or fine powder having an average particle diameter within the above-mentioned range before granulation and preferably has an average particle diameter, after granulation, of not greater than 1000 μm, more preferably not greater than 900 μm, still more preferably 200 to 900 μm, particularly preferably not greater than 600 μm.

When the powder in question is one not granulated or one before granulation, the average particle diameter thereof is measured by dry laser method using a particle diameter distribution measuring apparatus (HELOS & RODOS, product of Sympatec).

The above-mentioned average particle diameter after granulation is measured by the dry sieve method, specifically the average particle diameter measuring method described in WO 99/12996, page 12, line 23 to page 13, line 4.

Since the modified PTFE molding powder has a specific surface area and an average particle diameter within the respective ranges specified above, the pressure transfer on the occasion of molding is good, so that the powder can be molded with ease; further, moldings excellent in denseness can be obtained.

The modified PTFE molding powder according to the invention preferably has an apparent density of 0.60 to 0.95 g/ml.

A more preferred lower limit to the above apparent density is 0.65 g/ml, and a more preferred upper limit thereto is 0.90 g/ml.

In the present specification, the apparent density is the value measured in accordance with JIS K 6891 5.3.

The modified PTFE molding powder according to the invention is preferably one having an apparent density of 0.60 to 0.95 g/ml and an average particle diameter of not greater than 1000 μm, more preferably one having an apparent density within the above range and an average particle diameter of not greater than 600 μm, from the viewpoint of flexing resistance and, further, of electrical and mechanical physical properties.

The modified PTFE molding powder whose apparent density is within the above range, or whose average particle diameter is within the above range, or whose apparent density and average particle diameter are within the respective ranges mentioned above can be prepared, for example, (1) by granulating a fine powder obtained by shear pulverizing and having an average particle diameter of not greater than 100 μm, preferably not greater than 50 μm, as measured by dry laser method or (2) by granulating a fine powder obtained by impact pulverizing and having an average particle diameter of not greater than 50 μm, preferably not greater than 30 μm, as measured by dry laser method.

The granulation product obtained by granulating a fine powder obtained by any of the above-mentioned methods of pulverizing generally occurs as a granular powder. The granular powder having an apparent density within the range specified above is desirably one preferably having an average particle diameter, after granulation, of not greater than 1000 μm, more preferably not greater than 900 μm, still more preferably 20 to 900 μm, particularly preferably not greater than 600 μm, as mentioned above.

When it has an apparent density and an average particle diameter after granulation within the respective ranges mentioned above, the modified PTFE molding powder can be made up into moldings excellent in flexing resistance and in flex life.

The modified PTFE molded article according to the invention is preferably ones formed using the above-mentioned modified PTFE molding powder.

The modified PTFE molding powder cannot be melt-molded but can be properly molded, for example, by the method of producing a modified PTFE molded article according to the invention, which is to be described later herein.

The modified PTFE molded article according to the invention shows a heat of fusion of not greater than 28 J/g.

So long as it is within the above range, the heat of fusion may be greater than 18 J/g. Preferably, however, it is not greater than 25 J/g, more preferably not greater than 23 J/g.

Since the heat of fusion is within the above range, the modified PTFE molded article of the invention is low in crystallinity and excellent in flexing resistance.

In the present specification, the heat of fusion is the value calculated from the crystallization point curve peak measured by cutting out small pieces from the modified PTFE molded article, heating about 3 mg of the small pieces to 250° C. on a differential scanning calorimeter RDC220 (product of Seiko Denshi Kogyo) in a nitrogen atmosphere at a rate of 50° C./minute, maintaining that temperature for 1 minute, then further raising the temperature to 380° C. at a rate of 10° C./minute for sufficient melting of the crystals and then lowering the temperature from 380° C. to 250° C. at a rate of 10° C./minute.

The modified PTFE molded article of the invention has a flex life [MIT] of at least $200 \times 10^4$ cycles. The flex life [MIT] is preferably not lower than $2.5 \times 10^6$. Within the above range, the flex life [MIT] may be not higher than $3 \times 10^6$, or not higher than $2.8 \times 10^6$.

The modified PTFE molded article of the invention shows an flex life [MIT] within the above range, so that it is very excellent in flexing resistance.

The flex life [MIT] is measured in accordance with JIS P 8115 by testing test specimens having a width of 5 mm, a thickness of 0.5 mm and a minimum length of 120 mm as cut out from each modified PTFE molded article using an MIT folding endurance tester (product of Yasuda Seiki).

The modified PTFE molded article of the invention can generally show a flex life, at −10° C., of $3 \times 10^5$ cycles or longer in de Mattia testing in accordance with JIS K 6301 using dumbbells having a specific shape with a notch at the midpoint of the length thereof (hereinafter sometimes referred to as "special de Mattia test"). In the present specification, the flex life measured by the special de Mattia test is the value determined by preparing test specimens having a size of width 20 mm×length 150 mm×thickness 1 mm with a 10-mm-wide notch cut at 900 in the midpoint of the length thereof and subjecting them to measurement using a de Mattia flexing machine (product of Yasuda Seiki) in accordance with JIS K 6301.

In the special de Mattia flex life test, the flexing resistance is measured with higher precision than in the above-mentioned MIT test. Generally, therefore, even when the MIT fold number is within the range specified above, the flex life revealed by the special de Mattia test may sometimes be lower than the above-specified range. On the other hand, if the flex life revealed by the special de Mattia test falls within the above range, the MIT value falls within the above range. The modified PTFE molded article of the invention has an MIT value within the above range and, further, can attain the special de Mattia test flex life within the range mentioned above.

The modified PTFE molded article of the invention preferably has a tensile strength of not lower than 30 MPa.

A more preferred lower limit to the above tensile strength is 35 MPa, a still more preferred lower limit thereto is 40 MPa and, so long as it is within the above range, it may be 60 MPa or lower.

The modified PTFE molded article of the invention preferably shows a tensile elongation of not lower than 300%.

A more preferred lower limit to the above tensile elongation is 350%, a still more preferred lower limit thereto is 380% and, so long as it is within the above range, it may be 500% or lower.

The tensile strength and tensile elongation referred to above are measured in accordance with JIS K 6891.

The modified PTFE molded article of the invention can attain excellent flexing resistance without substantial decreases in such mechanical properties as the above-mentioned tensile strength and tensile elongation.

Hereinafter, the modified PTFE molded article of the invention as formed by using the modified PTFE molding powder described above is sometimes referred to as "modified PTFE molded article (A) of the invention".

The method of producing a modified PTFE molded article according to the invention is a method of producing a modified PTFE molded article by a sintering treatment of a pretreatment sintered compression molding obtained from a modified PTFE powder. In the production method, the modified PTFE molding powder mentioned above is preferably used as the modified PTFE powder.

The above-mentioned "pretreatment sintered compression molding" is a molding prepared by sintering an unsintered compression molding formed from a modified PTFE powder at a temperature not lower than the melting point of the modified PTFE powder (hereinafter, such sintering is sometimes referred to as "primary sintering step") and then cooling the molding to a temperature lower than the melting point of the modified PTFE powder (hereinafter, such cooling is referred to as "primary cooling step").

The "unsintered compression molding" referred to above is a molding formed by compression of the modified PTFE powder placed in a mold and having no history of being heated to the melting point of the modified PTFE powder or a higher temperature.

The pressure to be applied on the occasion of compressing for forming the above unsintered compression moldings is preferably 0.1 MPa to 100 MPa; a more preferred lower limit thereto is 1 MPa, and a more preferred upper limit thereto is 80 MPa.

The primary sintering step for sintering the above-mentioned "unsintered compression molding" at a temperature not lower than the melting point of the modified PTFE powder is preferably carried out at a temperature of 345 to 400° C., although this temperature may vary depending on the thickness of the unsintered compression molding, the sintering time and other factors. A more preferred lower limit to the sintering temperature is 360° C., and a more preferred upper limit thereto is 390° C. Generally, the above primary sintering step can be carried out by placing the unsintered compression molding formed at room temperature in a sintering furnace adjusted to a sintering temperature within the range mentioned above.

In the present specification, the melting point of the modified PTFE powder is the value determined as the temperature corresponding to the peak of heat of fusion that can be measured upon heating a 3-mg sample to 380° C. at a rate of 10° C./minute on a model DSC-50 differential scanning calorimeter (product of Shimadzu Corporation).

In the primary cooling step which follows the above-mentioned primary sintering step and comprises cooling the molding to a temperature lower than the melting point of the modified PTFE powder, it is generally preferred that the molding be cooled to ordinary temperature to 300° C., more preferably to ordinary temperature to 150° C.

The crystallinity of the finally obtained modified PTFE molded articles substantially depends on the rate of cooling after the secondary sintering step to be described later herein and, therefore, the rate of cooling in the primary cooling step is not particularly restricted but, for example, the moldings may be allowed to cool in the atmosphere.

The "compression molding" to be carried out on the occasion of forming the above-mentioned unsintered compression molding may be (i) "compression molding in a narrow sense of the term" comprising placing the resin powder in a mold, compressing the same to form a preshaped body (preform) and then sintering the same, or (ii) ram extrusion molding which comprises charging a axially long mold with the resin powder and sintering the compression molding formed by causing the same to descend into a sintering section of the mold for sintering.

In the practice of the invention, use may be made of (1) the method comprising forming the pretreatment sintered compression molding in the manner mentioned above, immediately followed by subjecting it to the sintering treatment to be described later herein or (2) the method according to which the time of completion of forming the pretreatment sintered compression molding is apart, in a discontinuous manner, from the time of starting the sintering treatment to be described later herein.

As the former method (1) which comprises forming the pretreatment sintered compression molding, immediately followed by subjecting it to the sintering treatment, there may be mentioned, for example, the method comprising carrying out the formation of the pretreatment sintered compression molding and the sintering treatment thereof in a continuous manner by ram extrusion molding while transferring the molding through an axially long mold.

The latter discontinuous method (2) may be, for example, the method comprising purchasing commercial products corresponding to the above-mentioned pretreatment sintered compression molding and subjecting them to the sintering treatment described below, or the method comprising producing the pretreatment sintered compression molding in the so-called batchwise manner and then subjecting it to the sintering treated described below. The latter batch method is a suitable method when compression molding in a narrow sense of the term is employed.

The sintering treatment in the method of producing a modified PTFE molded article according to the invention is applied to the above-mentioned pretreatment sintered compression molding.

The above-mentioned sintering treatment is carried out in the manner of sintering at a temperature not lower than the melting point of the modified PTFE powder (hereinafter sometimes referred to as "secondary sintering step").

The secondary sintering step is preferably carried out by heating at a temperature of 345 to 400° C. although the temperature may vary depending on the thickness of the pretreatment sintered compression molding, the sintering time and so forth. A more preferred lower limit to the sintering temperature is 350° C., a still more preferred lower limit is 360° C., a more preferred upper limit is 395° C., and a still more preferred upper limit is 390° C.

The rate of temperature raising in starting the sintering in the secondary sintering step is not particularly restricted but, for example, in the case of continuous sintering treatment following production of pretreatment sintered compression molding by ram extrusion molding, as described above under (1), the sintering treatment is preferably carried out in a manner such that the axially long mold is divided into roughly equal three parts, namely a primary sintering step zone set at 350 to 400° C., a primary cooling step zone and a secondary sintering step zone set at 350 to 400° C., and the compression molding is moved through the zones in that order.

As for the rate of temperature raising in starting the sintering in the secondary sintering step in the above-mentioned batchwise process (2), it is generally preferred that the sintering be carried out by feeding the pretreatment sintered compression molding prepared at ordinary temperature to a sintering furnace set in advance at a sintering temperature within the range mentioned above.

The sintered compression molding after passage through the secondary sintering step in the above sintering treatment are cooled (hereinafter sometimes referred to as "secondary cooling step"). In the secondary cooling step, cooling is made to a temperature below the melting point of the modified PTFE powder. The cooling temperature in this step is not particularly restricted but, generally, it may be a temperature at which the modified PTFE molded article obtained is stored or used.

The rate of cooling in the secondary cooling step depends on the shape and size of the molding but, by controlling and adjusting the rate of cooling, it may be possible to adjust the crystallinity according to the desired level of flexing resistance. From the viewpoint of ease of control, among others, (a) rapid cooling by placement in water immediately after completion of the secondary sintering step or (b) gradual cooling by taking out of the sintering furnace after completion of the secondary sintering step and allowing to cool in the atmosphere at room temperature is generally sufficient in actuality.

The method of producing a modified PTFE molded article according to the invention comprises the above-mentioned sintering treatment. For example, in the prior art case of carrying out annealing at a temperature lower than the melting point of the resin in lieu of such sintering treatment, a certain kind of tension created along the boundary between the crystalline region and noncrystalline region after the sintering corresponding to the above-mentioned primary sintering step is thought to be relaxed by that annealing only to an insufficient extent from the flexing resistance improvement viewpoint. On the contrary, the method of producing a modified PTFE molded article according to the invention presumably promotes the above-mentioned relaxation of tension as a result of the above-mentioned sintering treatment carried out at a temperature not lower than the melting point of the modified PTFE powder.

The modified PTFE molded article obtained by carrying out the above-mentioned method of producing a modified PTFE molded article according to the invention also constitutes an aspect of the present invention.

Hereinafter, the modified PTFE molded article obtained by carrying out the method of producing a modified PTFE molded article according to the invention is sometimes referred to as "modified PTFE molded article (B) of the invention".

The modified PTFE molded article (B) of the invention is a molding obtained by the above-mentioned method of producing a modified PTFE molded article according to the invention and, like the modified PTFE molded article (A) of the invention, is low in crystallinity and excellent in mechanical physical properties such as flexing resistance.

Hereinafter, the term "modified PTFE molded article of the invention", when used without adding the sign (A) or (B), can conceptually include the above-mentioned "modified PTFE molded article (A)" and "modified PTFE molded article (B)".

The modified PTFE molded article of the invention is excellent in mechanical characteristics, in particular flexing resistance and creep resistance, and therefore can suitably be used as flexing resistant moldings and creep resistant moldings, among others.

The flexing resistant moldings include, among others, bellows, diaphragms, hoses, piston rings, and butterfly valves.

The creep resistant moldings include, among others, ball valve sheets, diaphragms, packing materials, gaskets, piston rings, bellows, diaphragms, and butterfly valves.

The modified PTFE molded article of the invention is excellent in chemical resistance as well and, therefore, can further be used properly as chemical permeation resistant moldings.

As the chemical permeation resistant moldings, there may be mentioned bellows and diaphragms of chemical pumps, among others.

The above-mentioned chemical pumps can be used in transporting highly corrosive fluids used in chemical industries and semiconductor manufacturing plants, for example such gases as fluorine, hydrogen chloride, sulfur oxides and nitrogen oxides; various organic acids, acid halides and like liquids, such as hydrogen fluoride, hydrochloric acid, sulfuric acid, nitric acid, phosphorus oxychloride, thionyl chloride, sulfuryl chloride and chromic acid; and so forth.

EFFECTS OF THE INVENTION

The modified PTFE molded article of the invention, which has the constitution described hereinabove, is excellent in flexing resistance without the tensile strength and tensile elongation thereof being impaired.

The method of producing a modified PTFE molded article according to the invention, which has the constitution described hereinabove, makes it possible to produce a modified PTFE molded article having the characteristics mentioned above in an easy and simple manner.

BEST MODES FOR CARRYING OUT THE INVENTION

The following examples and comparative examples illustrate the present invention specifically. These examples and comparative examples are, however, by no means limitative of the scope of the invention.

SYNTHESIS EXAMPLE 1

A 170-L autoclave was charged with a solution of 3.3 g of ammonium carbonate in 54.8 L of pure water (aqueous medium), and the contents were stirred using an anchor impeller (110 r.p.m.). After deaeration, tetrafluoroethylene [TFE] was fed to 0.5 kg/cm$^2$ (gage pressure). This procedure was repeated three times and then TFE was fed under pressure, together with 85 g of perfluoro(propyl vinyl ether) [PPVE], and the reaction system temperature was raised to 50° C. and, then, TFE was fed until arrival of the reaction system inside pressure at 8 kg/cm$^2$. Thereafter, 0.2 L of an aqueous solution of ammonium persulfate (concentration: about 0.36% by mass) was added to initiate the polymerization. The polymerization was carried out while TFE was continuously fed under pressure so that the reaction system inside pressure might be maintained at 8 kg/cm$^2$. After consumption of 22.5% by mass, relative to the aqueous medium, of TFE, the remaining TFE and PPVE were released from the autoclave to thereby terminate the reaction. After completion of the above polymerization, the autoclave contents were cooled to room temperature, and the solid was recovered and dried to give a modified PTFE powder.

The modified PTFE powder obtained was taken out and ground to an average particle size of 42 μm using a hammer mill. A modified PTFE molding powder (powder 1) was thus obtained.

The modified polytetrafluoroethylene [modified PTFE] molding powder obtained and the granulated powder derived therefrom as described later herein were subjected to PPVE content, specific surface area, heat of crystallization, apparent density and average particle diameter measurements according to the methods described below.

(1) PPVE Content

The PPVE content was measured by infrared spectroscopy in the characteristic absorption interval of 1040 to 890 cm$^{-1}$.

(2) Specific Surface Area

Measurements were made according to the nitrogen adsorption method described in Analytical Chemistry, vol. 30, page 1387 (1985) using Monosorb (product of Yuasa Ionics).

(3) Heat of Crystallization

Using a model DSC-50 differential scanning calorimeter (product of Shimadzu Corp.), each sample (3 mg) was heated to 380° C. at a rate of 10° C./minute, and the heat of fusion peak that could be observed on that occasion was analyzed to determine the heat of crystallization.

(4) Apparent Density

Measurements were made according to JIS K 6891 5.3.

(5) Average Particle Diameter of Ground Powder

Measurements were made by dry laser method using a particle diameter distribution measuring apparatus (HELOS & RODOS, product of Sympatec).

(6) Average Particle Diameter after Granulation

Measurement were made according to JIS K 6891 5.4; the vibration time was 10 minutes.

The modified PTFE molding powder obtained in this synthesis example had a PPVE content of 0.062% by mass and a specific surface area of 1.5 m$^2$/g.

This powder was granulated in the conventional manner, and a granulated powder having an apparent density of 0.8 g/ml and an average particle diameter of 500 μm and showing a heat of crystallization of 21.9 J/g.

EXAMPLE 1

A ram extrusion mold having a mold inside diameter of 46ø, a mold length of 1100 mm and a heating zone length of 900 mm with the upper 300-mm section of the heating zone being set at a temperature of 380° C., the middle 300-mm section at 380° C. and the lower 300-mm section at 350° C. was used. The granulated powder derived from the modified PTFE molding powder 1 obtained in Synthesis Example 1 was extruded through the mold; the filling length was 60 mm, the pressure was 3 MPa, the pressure application time was 55 seconds, and the total time for each cycle was 65 seconds. The molding formed was then cooled to room temperature to give a pretreatment sintered compression molding.

The pretreatment sintered compression molding obtained was cut to an arbitrary length, and the cut pieces were subjected to 30 minutes of sintering treatment in an electric furnace set beforehand at 380° C. and then cooled to room temperature to give the modified PTFE molded article (molded article 1) of the invention.

EXAMPLE 2

A ram extrusion mold having a mold inside diameter of 46ø, a mold length of 1100 mm and a heating zone length of 900 mm with the upper 300-mm section of the heating zone being set at a temperature of 380° C., the middle 300-mm section at 380° C. and the lower 300-mm section at 350° C. was used. The granulated powder derived from the modified PTFE molding powder 1 obtained in Synthesis Example 1 was extruded through the mold; the filling length was 60 mm, the pressure was 3 MPa, the pressure application time was 55 seconds, and the total time for each cycle was 65 seconds. Subsequent to this primary sintering step, the molding was passed through a cooling zone (length: about 300 mm) equipped with a jacket (with cooling water at 5° C. being passed through the jacket inside) and connected to the lower section of the ram extrusion mold to give a pretreatment sintered compression molding. The pretreatment sintered compression molding obtained was then further passed through an extrusion mold having a mold inside diameter of 50ø and a length of 500 mm and set at 380° C. to thereby cause remelting and carry out the secondary sintering step. The molding was then taken out of the mold and allowed to cool to room temperature to give a modified PTFE molded article (molded article 2).

EXAMPLE 3

A mold for compression molding with a mold inside diameter of 50ø and a mold length of 500 mm was charged with 210 g of the granulated powder derived from the modified PTFE molding powder 1 obtained in Synthesis Example 1, and the charge was held at room temperature under a pressure of 29.4 MPa for 5 minutes to give an unsintered compression molding.

The unsintered compression molding obtained was taken out of the mold, sintered at 370° C. for 5 hours and then allowed to cool to room temperature to give a pretreatment sintered compression molding. The pretreatment sintered compression molding obtained was sintered in an electric furnace set beforehand at 380° C. for 5 hours, then taken out of the furnace and allowed to cool to room temperature. A modified PTFE molded article (molded article 3) of the invention was thus obtained.

COMPARATIVE EXAMPLE 1

A ram extrusion mold having a mold inside diameter of 46ø, a mold length of 1100 mm and a heating zone length of 900 mm with the upper 300-mm section of the heating zone being set at a temperature of 380° C., the middle 300-mm section at 380° C. and the lower 300-mm section at 350° C. was used. The granulated powder derived from the modified PTFE molding powder 1 obtained in Synthesis Example 1 was extruded through the mold; the filling length was 60 mm, the pressure was 3 MPa, the pressure application time was 55 seconds, and the total time for each cycle was 65 seconds. The sintered product obtained was taken out of the mold and cut to an arbitrary length. Molding A was thus obtained.

COMPARATIVE EXAMPLE 2

A mold for compression molding with a mold inside diameter of 50ø and a mold length of 500 mm was charged with 210 g of the granulated powder derived from the modified PTFE molding powder 1 obtained in Synthesis Example 1, and the charge was held at room temperature under a pressure of 29.4 MPa for 5 minutes. The resulting molding was then taken out of the mold and heated in an electric furnace to 370° C. at a rate of 50° C./hour, then sintered at 370° C. for 5 hours and, thereafter, cooled to room temperature at a rate of 50° C./hour to give molding B.

COMPARATIVE EXAMPLE 3

A mold for compression molding with a mold inside diameter of 50ø and a mold length of 500 mm was charged with 210 g of a commercial PTFE powder (DuPont-Mitsui Fluorochemicals' 70J), the charge was held at room temperature under a pressure of 29.4 MPa for 5 minutes, and the resulting molding was taken out of the mold, heated, in an electric furnace, to 370° C. at a rate of 50° C./hour, then sintered at 370° C. for 5 hours and, thereafter, cooled to room temperature at a rate of 50° C./hour to give molding C.

COMPARATIVE EXAMPLE 4

A ram extrusion mold having a mold inside diameter of 46ø, a mold length of 1100 mm and a heating zone length of 900 mm with the upper 300-mm section of the heating zone being set at a temperature of 390° C., the middle 300-mm section at 380° C. and the lower 300-mm section at 370° C. was used. A commercial PTFE (Asahi Glass' G307) powder was extruded through the mold; the filling length was 60 mm, the pressure was 2.5 MPa, the pressure application time was 55 seconds, and the total time for each cycle was 65 seconds. The sintered product obtained was taken out of the mold and cut to an arbitrary length. Molding D was thus obtained.

TESTING EXAMPLE

The moldings obtained in Examples 1 to 3 and Comparative Examples 1 to 4 were subjected to flex life (MIT), tensile strength (TS), tensile elongation (EL) and heat of fusion measurements by the test methods described below.

Test Methods

1) MIT

Test specimens with a width of 5 mm, a thickness of 0.5 mm and a minimum length of 120 mm were cut out from each molding and subjected to measurement using an MIT folding endurance tester (product of Yasuda Seiki) according to JIS P 8115.

2) TS and EL

JIS dumbbell No. 3 test specimens were punched out from each molding and subjected to measurement according to JIS K 6891.

3) Heat of Fusion

Small pieces were cut out from each molding, an about 3 mg portion of the pieces was weighed accurately and placed in an aluminum pan for exclusive use, and the measurement was carried out using a model RDC220 DSC apparatus (product of Seiko Denshi Kogyo). In carrying out the measurement, the aluminum pan was first heated, in a nitrogen atmosphere, to 250° C. at a rate of 50° C./minute, maintained at that temperature for 1 minute and then further heated to 380° C. at a rate of 10° C./minute for sufficient melting of the crystals. Then, the temperature was lowered from 380° C. to 250° C. at a rate of 10° C./minute, and the heat of fusion was calculated based on the thermal peak at the crystallization.

TABLE 1

| | Example 1 (Modified PTFE molded article 1) | Example 2 (Modified PTFE molded article 2) | Example 3 (Modified PTFE molded article 3) | Comprative Example 1 (Molding A) | Comprative Example 2 (Molding B) | Comprative Example 3 (Molding C) | Comprative Example 4 (Molding D) |
|---|---|---|---|---|---|---|---|
| Heat of fusion (J/g) | 22 | 21 | 22 | 22 | 28 | 32 | 26 |
| MIT ($\times 10^4$ cycles) | 280 | 280 | 260 | 100 | 140 | 90 | 50 |
| Tensile strength (MPa) | 45 | 46 | 46 | 40 | 45 | 39 | 28 |
| Tensile elongation (%) | 380 | 385 | 380 | 330 | 340 | 350 | 280 |

The modified PTFE molded articles 1 to 3 obtained by sintering the corresponding pretreatment sintered compression moldings were always superior in MIT, tensile strength and tensile elongation to the molding A obtained without carrying out the secondary sintering step and to the moldings B and C obtained by using the above-specified commercial modified PTFE species, respectively.

Although the molding B obtained by compression molding in a narrow sense of the term without carrying out the secondary sintering step was excellent in tensile strength, the modified PTFE molded articles 1 to 3, as compared with the molding B were excellent in MIT and tensile elongation without impairment in tensile strength.

SYNTHESIS EXAMPLE 2

A modified PTFE powder was prepared in the same manner as in Synthesis Example 1. The modified PTFE powder obtained was subjected to impact pulverizing using an air jet mill, and thus-prepared fine powder with an average particle diameter of 20 μm was further granulated to give a granular powder with an apparent density of 0.80 g/ml, an average particle diameter of 600 μm and a heat of crystallization of 22.1 J/g (modified PTFE molding powder 2).

EXAMPLE 4

A cylindrical mold for compression molding with an inside diameter of 50 mm and a length of 500 mm was charged with 210 g of the modified PTFE molding powder 2, the charge was held at room temperature under a pressure of 29.4 MPa for 5 minutes to give a preform. The preform obtained was heated to 365° C. at a rate of 50° C./hour, then sintered at 365° C. for 5 hours and, thereafter, cooled at a rate of 50° C./hour to give modified PTFE molded article 4 showing a heat of fusion of 26 J/g and a flex life of $280 \times 10^4$ cycles.

The modified PTFE molded article 4 obtained was subjected to the special de Mattia test for durability testing at −10° C.; the flex life was $30 \times 10^4$ cycles.

The special de Mattia test was carried out in the following manner. Test specimens having a size of width 20 mm×length 150 mm×thickness 1 mm with a 10-mm-wide notch cut at 90° in the midpoint of the length thereof were prepared and subjected to measurement using a de Mattia flexing machine (product of Yasuda Seiki) in accordance with JIS K 6301 in an atmosphere maintained at −10° C.±1° C. under the conditions: flex stroke distance: 50 mm, number of flex fatigue cycles: 300 cycles per minute. In determining the flex life, the flex fatigue-due breakage was detected based on a change in reflective laser sensor intensity. In the above test, 5 runs were carried out for one and the same sample, and the mean of three test values other than the maximum and minimum values was employed as the measured value.

EXAMPLE 5

A cylindrical mold for compression molding with an inside diameter of 50 mm and a length of 500 mm was charged with 210 g of the modified PTFE molding powder 2, the charge was held at room temperature under a pressure of 29.4 MPa for 5 minutes to give a 50ø unsintered compression molding with a height of 50 mm. The unsintered compression molding obtained was sintered at 365° C. for 5 hours and then allowed to cool. The thus-obtained pretreatment sintered compression molding was further sintered at 380° C. for 5 hours and then allowed to cool to give modified PTFE molded article 5 showing a heat of fusion of 22 J/g and a flex life of $370 \times 10^4$ cycles.

This modified PTFE molded article 5 was subjected to special de Mattia testing in the same manner as in Example 4 for durability testing at −10° C.; the flex life was $50 \times 10^4$ cycles.

EXAMPLE 6

The modified PTFE molding powder 2 was molded in the same manner as in Example 1, and a modified PTFE molded article 6 showing a heat of fusion of 22 J/g and a flex life of $380 \times 10^4$ cycles was obtained.

This modified PTFE molded article 6 was subjected to special de Mattia testing in the same manner as in Example 4 for durability testing at −10° C.; the flex life was $50 \times 10^4$ cycles.

SYNTHESIS EXAMPLE 3

A modified PTFE powder prepared in the same manner as in Synthesis Example 1 was subjected to shear pulverizing using a hammer mill. A modified PTFE molding powder 3 showing a heat of crystallization of 24 J/g and having an average particle diameter of 42 μm was thus prepared.

SYNTHESIS EXAMPLES 4 TO 7

A modified PTFE molding powder 4 with an average particle diameter of 20 μm and a heat of crystallization of 23 J/g, a modified PTFE molding powder 5 with an average particle diameter of 25 μm and a heat of crystallization of 23 J/g, a modified PTFE molding powder 6 with an average particle diameter of 27 μm and a heat of crystallization of 23 J/g and a modified PTFE molding powder 7 with an average particle diameter of 34 μm and a heat of crystallization of 24 J/g were prepared by impact pulverizing in the same manner as in Synthesis Example 2.

EXAMPLES 7 TO 11

A cylindrical mold for compression molding with an inside diameter of 50 mm and a length of 500 mm was charged with 210 g of one of the modified PTFE molding powders 3 to 7, the charge was held at room temperature under a pressure of 29.4 MPa for 5 minutes to give a 50ø preform with a height of 50 mm. The preform was sintered at 365° C. for 5 hours and then cooled at a rate of 50° C./hour. In this manner, the modified PTFE molding powders 3 to 7 respectively gave a modified PTFE molded article 7 with a heat of fusion of 27 J/g and a flex life of $230 \times 10^4$ cycles, a modified PTFE molded article 8 with a heat of fusion of 26 J/g and a flex life of $390 \times 10^4$ cycles, a modified PTFE molded article 9 with a heat of fusion of 26 J/g and a flex life of $360 \times 10^4$ cycles, a modified PTFE molded article 10 with a heat of fusion of 26 J/g and a flex life of $340 \times 10^4$ cycles, and a modified PTFE molded article 11 with a heat of fusion of 27 J/g and a flex life of $300 \times 10^4$ cycles.

Each of those modified PTFE molded articles was subjected to special de Mattia testing in the same manner as in Example 4 for durability testing at −10° C.; the flex lives of the modified PTFE molded articles 7 to 11 were $32 \times 10^4$ cycles, $50 \times 1$ cycles, $44 \times 1$ cycles, $42 \times 10^4$ cycles and $41 \times 10^4$ cycles, respectively.

The data obtained for the modified PTFE molded articles of Examples 4 to 11 are shown in Table 2.

the modified PTFE molded articles 12 to 16 were $36 \times 10^4$ cycles, $66 \times 10^4$ cycles, $54 \times 10^4$ cycles, $49 \times 10^4$ cycles and $48 \times 10^4$ cycles, respectively.

COMPARATIVE EXAMPLES 5 TO 9

A cylindrical mold for compression molding with an inside diameter of 50 mm and a mold length of 500 mm was charged with 210 g of one of the following commercial products: unmodified PTFE fine powder I (product name: 7AJ, product of DuPont-Mitsui Fluorochemicals; apparent density 0.45 g/ml, average particle diameter 36 μm), unmodified PTFE granular powder II (product name: 810J, product of DuPont-Mitsui Fluorochemicals; apparent density 0.86 g/ml, average particle diameter 440 μm), modified PTFE fine powder III (product name: 70J, product of DuPont-Mitsui Fluorochemicals; average particle diameter 35 μm), modified PTFE granular powder IV (product name: TFM1600, product of Dyneon; apparent density 0.84 g/ml, average particle diameter 480

TABLE 2

| | Example 4 (Modified PTFE molded article 4) | Example 5 (Modified PTFE molded article 5) | Example 6 (Modified PTFE molded article 6) | Example 7 (Modified PTFE molded article 7) | Example 8 (Modified PTFE molded article 8) | Example 9 (Modified PTFE molded article 9) | Example 10 (Modified PTFE molded article 10) | Example 11 (Modified PTFE molded article 11) |
|---|---|---|---|---|---|---|---|---|
| Heat of fusion (J/g) | 26 | 22 | 22 | 27 | 26 | 26 | 26 | 27 |
| MIT (×10⁴ cycles) | 280 | 370 | 380 | 230 | 390 | 360 | 340 | 300 |
| Special de Mattia test (×10⁴ cycles) | 30 | 50 | 50 | 32 | 50 | 44 | 42 | 41 |

EXAMPLES 12 TO 16

A cylindrical mold for compression molding with an inside diameter of 50 mm and a length of 500 mm was charged with 210 g of one of the modified PTFE molding powders 3 to 7, the charge was held at room temperature under a pressure of 29.4 MPa for 5 minutes to give a 50ø unsintered compression molding with a height of 50 mm. Each unsintered compression molding obtained was sintered at 365° C. for 5 hours and then allowed to cool to give a pretreatment sintered compression molding. Each pretreatment sintered compression molding obtained was sintered at 380° C. for 5 hours and then allowed to cool. In this manner, modified PTFE molded articles 12 to 16 were obtained.

The modified PTFE molded articles 12 to 16 were each subjected to special de Mattia testing in the same manner as in Example 4 for durability testing at −10° C.; the flex lives of μm), modified PTFE granular powder V (product name: TG170JS, product of DuPont-Mitsui Fluorochemicals; apparent density 0.58 g/ml, average particle diameter 630 μm). Each charge was held at room temperature under a pressure of 29.4 MPa for 5 minutes to give a 50ø preform with a height of 50 mm. The preform obtained was sintered at 365° C. for 5 hours and then cooled at a rate of 50° C./hour. In this manner, moldings E to I were obtained.

Those modified PTFE molded articles were each subjected to special de Mattia testing in the same manner as in Example 4 for durability testing at −10° C.; the flex lives of the moldings E to I were $9 \times 10^4$ cycles, $8 \times 10^4$ cycles, $2 \times 10^4$ cycles, $1.8 \times 10^4$ cycles and $1.7 \times 10^4$ cycles, respectively.

The data for the moldings obtained in Examples 12 to 16 and Comparative Examples 5 to 9 are shown in Table 3.

TABLE 3

| | Example 12 (Modified PTFE molded article 12) | Example 13 (Modified PTFE molded article 13) | Example 14 (Modified PTFE molded article 14) | Example 15 (Modified PTFE molded article 15) | Example 16 (Modified PTFE molded article 16) |
|---|---|---|---|---|---|
| Special de Mattia test ($\times 10^4$ cycles) | 36 | 66 | 54 | 49 | 48 |
| | Comprative Example 5 (Molding E) | Comprative Example 6 (Molding F) | Comprative Example 7 (Molding G) | Comprative Example 8 (Molding H) | Comprative Example 9 (Molding I) |
| Special de Mattia test ($\times 10^4$ cycles) | 9 | 8 | 2 | 1.8 | 1.7 |

INDUSTRIAL APPLICABILITY

The modified PTFE molded article of the invention, which has the constitution described hereinabove, is excellent in flexing resistance without the tensile strength and tensile-elongation thereof being impaired.

The method of producing a modified PTFE molded article according to the invention, which has the constitution described hereinabove, can easily produce a modified PTFE molded article having the characteristics mentioned above.

The invention claimed is:

1. A polytetrafluoroethylene molded article obtained by molding a modified polytetrafluoroethylene molding powder,
    wherein said modified polytetrafluoroethylene molding powder is not melt-moldable,
    a modified polytetrafluoroethylene constituting said modified polytetrafluoroethylene molding powder contains 0.01 to 1% by mass of a perfluorovinyl ether unit represented by the formula (I):

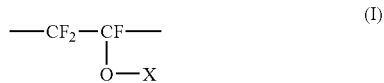

(wherein X is a perfluoroalkyl group containing 1 to 6 carbon atoms or a perfluoroalkoxyalkyl group containing 4 to 9 carbon atoms) and the heat of crystallization of the modified polytetrafluoroethylene constituting the modified polytetrafluoroethylene molding powder is 18.0 to 25.0 J/g as measured using a differential scanning colorimeter, and
    said polytetrafluoroethylene molded article has a heat of fusion of not more than 28 J/g and a flex life of at least $200 \times 10^4$ cycles.

2. The polytetrafluoroethylene molded article according to claim 1,
    which has a tensile strength of not lower than 30 MPa.

3. The polytetrafluoroethylene molded article according to claim 1, which has a tensile elongation of not lower than 300%.

4. The polytetrafluoroethylene molded article according to claim 1, which has a flex life at $-10°$ C. of not shorter than $30 \times 10^4$ cycles as determined in a de Mattia test according to JIS K 6301 using dumbbell specimens having a special shape with a notch in the midpoint of the length thereof.

5. A method of producing a polytetrafluoroethylene molded article,
    said method comprising a sintering treatment of a pretreatment sintered compression molding obtained from a modified polytetrafluoroethylene powder,
    wherein said pretreatment sintered compression molding is prepared by sintering an unsintered compression molding formed from a modified polytetrafluoroethylene powder at a sintering temperature of not lower than the melting point of said modified polytetrafluoroethylene powder, followed by cooling to a temperature lower than the melting point of said modified polytetrafluoroethylene powder, and
    said sintering treatment is carried out by sintering at a temperature of not lower than the melting point of said modified polytetrafluoroethylene powder.

6. The method of producing a polytetrafluoroethylene molded article according to claim 5,
    wherein said modified polytetrafluoroethylene powder is a fine powder obtained by shear pulverizing and having an average particle diameter of not greater than 100 μm as measured by dry laser method.

7. The method of producing a polytetrafluoroethylene molded article according to claim 5,
    wherein said modified polytetrafluoroethylene powder is a granular powder obtained by granulation of a fine powder obtained by shear pulverizing,
    said fine powder having an average particle diameter of not greater than 100 μm as measured by dry laser method.

8. The method of producing a polytetrafluoroethylene molded article according to claim 5,
    wherein said modified polytetrafluoroethylene powder is a granular powder obtained by granulation of a fine powder obtained by shear pulverizing and having an apparent density of 0.60 to 0.95 g/ml,
    said fine powder having an average particle diameter of not greater than 100 μm as measured by dry laser method.

9. The method of producing a polytetrafluoroethylene molded article according to claim 8,
    wherein said modified polytetrafluoroethylene powder is a granulation product further having an average particle diameter of not greater than 900 μm as measured by dry sieve method.

10. The method of producing a polytetrafluoroethylene molded article according to claim 5,
    wherein said modified polytetrafluoroethylene powder is a fine powder obtained by impact pulverizing and having an average particle diameter of not greater than 50 μm as measured by dry laser method.

11. The method of producing a polytetrafluoroethylene molded article according to claim 5,
    wherein said modified polytetrafluoroethylene powder is a granular powder obtained by granulation of a fine powder obtained by impact pulverizing,
    said fine powder having an average particle diameter of not greater than 50 μm as measured by dry laser method.

12. The method of producing a polytetrafluoroethylene molded article according to claim 5, wherein said modified polytetrafluoroethylene powder is a granular powder obtained by granulation of a fine powder obtained by impact pulverizing and having an apparent density of 0.60 to 0.95 g/ml, said fine powder having an average particle diameter of not greater than 50 μm as measured by dry laser method.

13. The method of producing a polytetrafluoroethylene molded article according to claim 12, wherein said modified polytetrafluoroethylene powder is a granulation product further having an average particle diameter of not greater than 900 μm as measured by dry sieve method.

14. A polytetrafluoroethylene molded article which is produced by the method of producing a polytetrafluoroethylene molded article according to claim 5.

* * * * *